United States Patent [19]
Paterno

[11] Patent Number: 5,775,982
[45] Date of Patent: Jul. 7, 1998

[54] WAX CONTAINER HAND BUFFER

[76] Inventor: Michael Paterno, 405 N. Woodward Dr., No. Massapequa, N.Y. 11758

[21] Appl. No.: 787,953

[22] Filed: Jan. 23, 1997

[51] Int. Cl.⁶ ............................................. A46B 13/04
[52] U.S. Cl. ................. 451/359; 451/446; 451/344; 15/97.1; 401/123
[58] Field of Search ..................... 451/344, 357, 451/353, 359, 446, 548, 552, 557, 508, 510, 524; 15/29, 97.1; 206/216; 401/123, 38, 19

[56] References Cited

U.S. PATENT DOCUMENTS

| | | | |
|---|---|---|---|
| 1,954,977 | 4/1934 | Albertson | 451/359 |
| 3,906,682 | 9/1975 | Glasser | 15/29 |
| 4,383,345 | 5/1983 | Alexander | 15/29 |
| 4,752,147 | 6/1988 | Persi | 401/123 |
| 5,231,727 | 8/1993 | Armbruster | 451/359 |
| 5,309,594 | 5/1994 | Thompson | 15/29 |

*Primary Examiner*—Eileen P. Morgan

[57] ABSTRACT

A new Wax Container Hand Buffer for buffing and polishing a vehicle by hand thereby producing an even finish and a high finish. The inventive device includes a cylindrical handle, the cylindrical handle includes a wax reservoir which can be access through a reservoir cap on the cornice of the cylindrical handle, a circular base secured to the end of the cylindrical handle opposite of the reservoir cap, and a buffer pad removably secured around the circular base by a concentric string fastener.

9 Claims, 3 Drawing Sheets

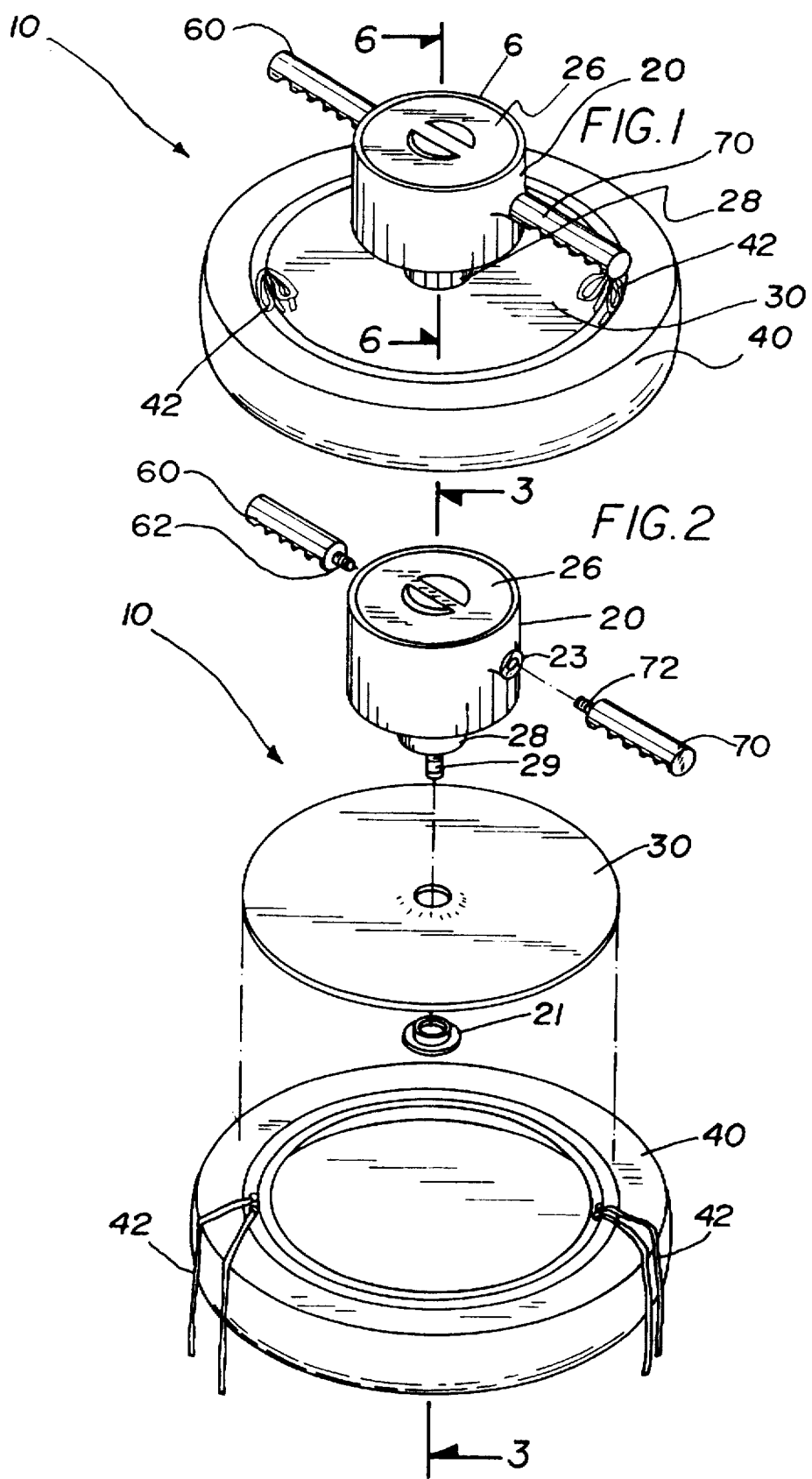

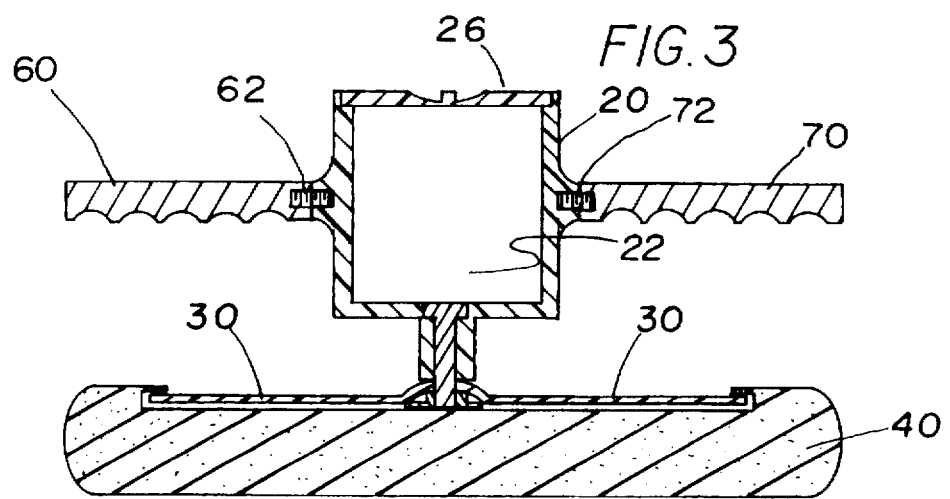
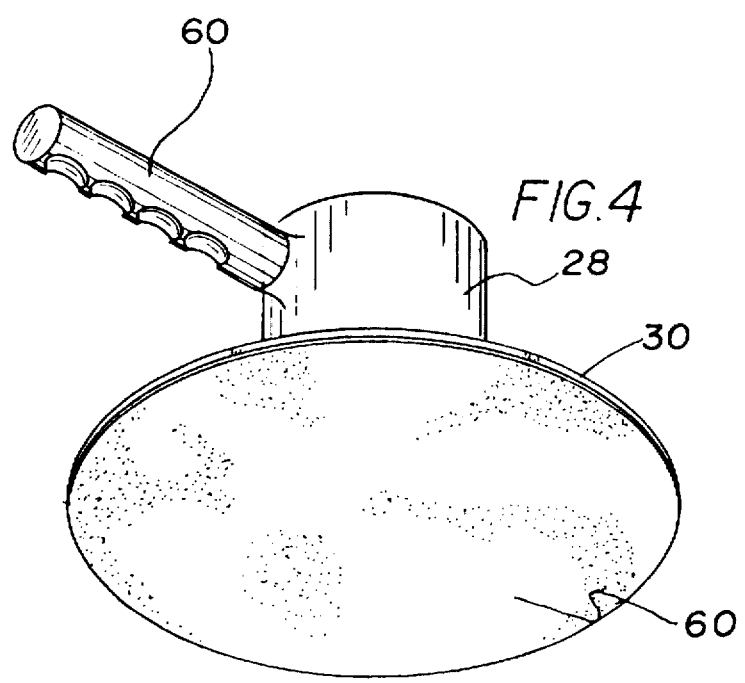

WAX CONTAINER HAND BUFFER

BACKGROUND OF THE INVENTION

1. Field of the Invention

The present invention relates to Polishing Devices and more particularly pertains to a new Wax Container Hand Buffer for buffing and polishing a vehicle by hand thereby producing an even finish and a high finish.

2. Description of the Prior Art

The use of Polishing Devices is known in the prior art. More specifically, Polishing Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Polishing Devices include U.S. Pat. No. 3,441,970; U.S. Pat. No. 4,383,345; U.S. Design Pat. 283, 590; U.S. Design Pat. 262,185; U.S. Pat. No. 4,876,760 and U.S. Pat. No. 4,688,356.

While these devices fulfill their respective, particular objectives and requirements, the aforementioned patents do not disclose a new Wax Container Hand Buffer. The inventive device includes a cylindrical handle, the cylindrical handle includes a wax reservoir which can be access through a reservoir cap on the cornice of the cylindrical handle, a circular base secured to the end of the cylindrical handle opposite of the reservoir cap, and a buffer pad removably secured around the circular base by a concentric string fastener.

In these respects, the Wax Container Hand Buffer according to the present invention substantially departs from the conventional concepts and designs of the prior art, and in so doing provides an apparatus primarily developed for the purpose of buffing and polishing a vehicle by hand thereby producing an even finish and a high finish.

SUMMARY OF THE INVENTION

In view of the foregoing disadvantages inherent in the known types of Polishing Devices now present in the prior art, the present invention provides a new Wax Container Hand Buffer construction wherein the same can be utilized for buffing and polishing a vehicle by hand thereby producing an even finish and a high finish.

The general purpose of the present invention, which will be described subsequently in greater detail, is to provide a new Wax Container Hand Buffer apparatus and method which has many of the advantages of the Polishing Devices mentioned heretofore and many novel features that result in a new Wax Container Hand Buffer which is not anticipated, rendered obvious, suggested, or even implied by any of the prior art Polishing Devices, either alone or in any combination thereof.

To attain this, the present invention generally comprises a cylindrical handle, the cylindrical handle includes a wax reservoir which can be access through a reservoir cap on the cornice of the cylindrical handle, a circular base secured to the end of the cylindrical handle opposite of the reservoir cap, and a buffer pad removably secured around the circular base by a concentric string fastener.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Wax Container Hand Buffer apparatus and method which has many of the advantages of the Polishing Devices mentioned heretofore and many novel features that result in a new Wax Container Hand Buffer which is not anticipated, rendered obvious, suggested, or even implied by any of the prior art Polishing Devices, either alone or in any combination thereof.

It is another object of the present invention to provide a new Wax Container Hand Buffer which may be easily and efficiently manufactured and marketed.

It is a further object of the present invention to provide a new Wax Container Hand Buffer which is of a durable and reliable construction.

An even further object of the present invention is to provide a new Wax Container Hand Buffer which is susceptible of a low cost of manufacture with regard to both materials and labor, and which accordingly is then susceptible of low prices of sale to the consuming public, thereby making such Wax Container Hand Buffer economically available to the buying public.

Still yet another object of the present invention is to provide a new Wax Container Hand Buffer which provides in the apparatuses and methods of the prior art some of the advantages thereof, while simultaneously overcoming some of the disadvantages normally associated therewith.

Still another object of the present invention is to provide a new Wax Container Hand Buffer for buffing and polishing a vehicle by hand thereby producing an even finish and a high finish.

Yet another object of the present invention is to provide a new Wax Container Hand Buffer which includes a cylindrical handle, the cylindrical handle includes a wax reservoir which can be access through a reservoir cap on the cornice of the cylindrical handle, a circular base secured to the end of the cylindrical handle opposite of the reservoir cap, and a buffer pad removably secured around the circular base by a concentric string fastener.

Still yet another object of the present invention is to provide a new Wax Container Hand Buffer that reduces the amount of time polish a vehicle.

Even still another object of the present invention is to provide a new Wax Container Hand Buffer that is adaptable for sanding jobs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an upper side perspective view of a new Wax Container Hand Buffer according to the present invention.

FIG. 2 is an exploded isometric view of the present invention.

FIG. 3 is a cross sectional view taken along line 3—3 of FIG. 2.

FIG. 4 is a bottom perspective view of an alternative embodiment of the present invention comprising a sand paper attachment.

DESCRIPTION OF THE PREFERRED EMBODIMENT

Figure 5:
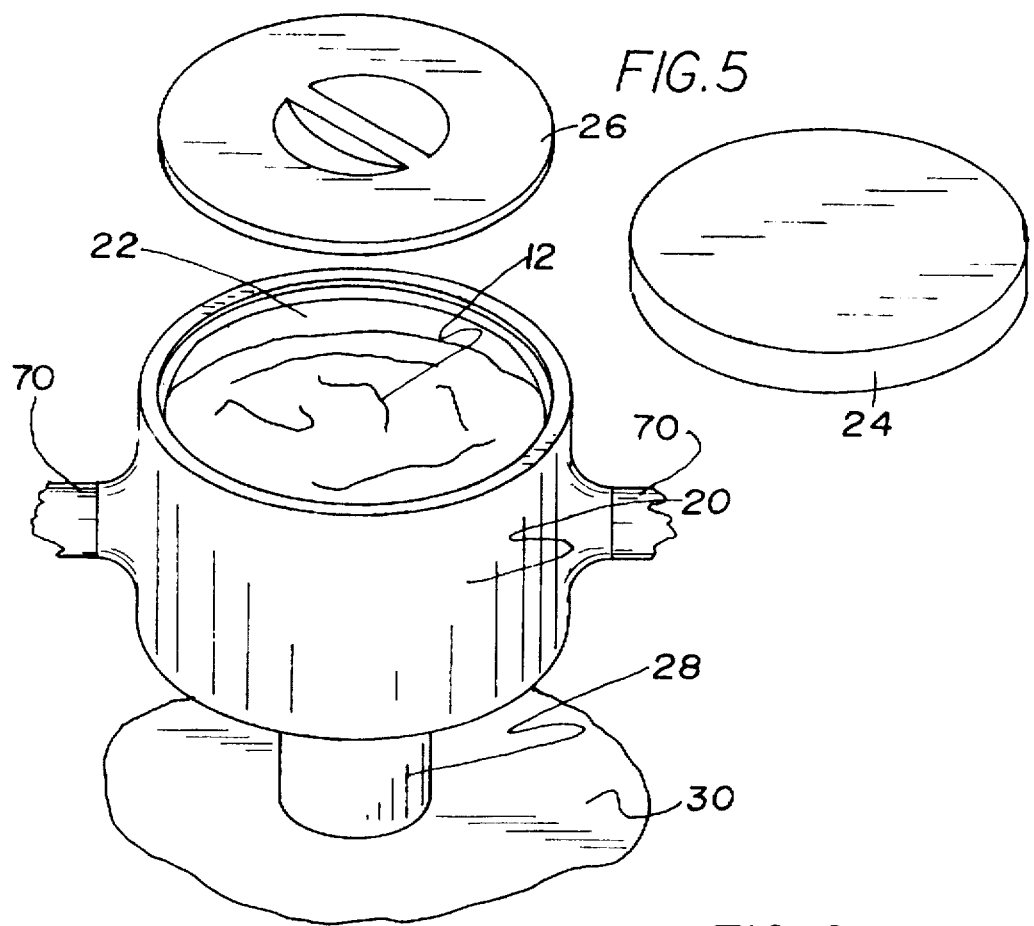
FIG. 5 is an upper perspective view of the cylindrical handle filled with wax.
Figure 6:
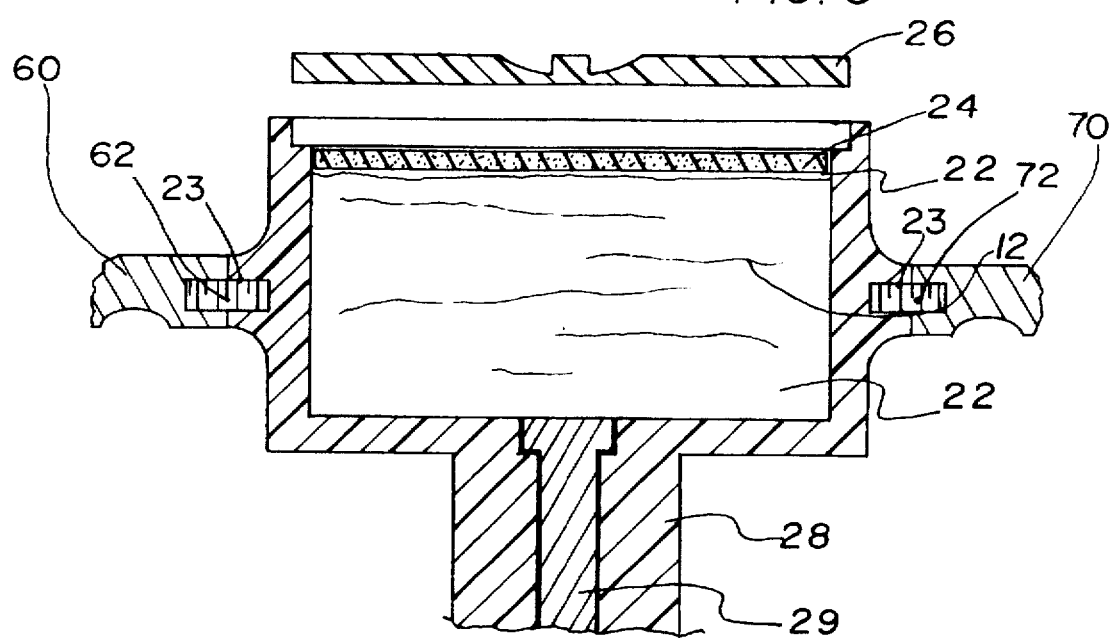
FIG. 6 is a cross sectional view taken along line 6—6 of FIG. 1.

With reference now to the drawings, and in particular to FIGS. 1 through 6 thereof, a new Wax Container Hand Buffer embodying the principles and concepts of the present invention and generally designated by the reference numeral 10 will be described.

More specifically, it will be noted that the Wax Container Hand Buffer 10 comprises a cylindrical handle 20, a tube 28 secured to the swaged end of the cylindrical handle 20, where the tube 28 is narrower than the cylindrical handle 20, a circular base 30 removably secured to the tube 28 orthogonal to the longitudinal axis of the cylindrical handle 20, and a buffer pad 40 removably secured to the circular base 30 opposite of the tube 28.

As best illustrated in FIGS. 3 and 5, it can be shown that the cylindrical handle 20 has a wax reservoir 22 which is exposed through the end opposite of the tube 28. The wax reservoir 22 stores wax 12 for utilization. The cylindrical handle 20 has a reservoir cap 26 which removably encloses the wax reservoir 22 thereby preventing contamination of the wax 12 within the wax reservoir 22. A circular sponge 24 is preferably removably positioned within the wax reservoir 22 above the wax within. As shown in FIGS. 1 and 2 of the drawings, the buffer pad 40 has at least one concentric string fastener 42 surrounding and engaging the edge of the circular cornice thereby forming a lip around the circular base 30 which may be loosened to remove. As best shown in FIG. 2 of the drawings, there is an additional concentric string fastener 42 for providing a backup to the other concentric string fastener 42 in the event it should become untied. The cylindrical handle 20 preferably has a fastener 29 projecting through the bottom of the wax reservoir 22 through the tube 28 then through the circular base 30 and engaging a retaining nut 21 as best shown in FIG. 3 of the drawings. The buffer pad 40 preferably comprises an unnumbered foam material which thereby stores and releases the wax 12 during the buffing of the vehicle. The buffer pad 40 preferably has an unnumbered cloth layer surrounding the unnumbered foam material. A first ergonomic handle 60 having a first threaded end 62 threadably engages a threaded aperture 23 within the cylindrical handle 20. The first ergonomic handle 60 projects radially away from the cylindrical handle 20 allowing the user to manually manipulate the invention.

Alternatively, a second ergonomic handle 70 having a second threaded end 72 threadably engages another threaded aperture 23 within the cylindrical handle 20 opposite of the first ergonomic handle 60. The second ergonomic handle 70 preferably projects radially away from the cylindrical handle 20 away from the first ergonomic handle 60 as best shown in FIG. 1 of the drawings.

In an alternative embodiment as shown in FIG. 4 of the drawings, a sand paper attachment 50 is removably secured to the circular base 30 opposite of the tube 28. The sand paper attachment 50 is preferably circular and shaped to fit the bottom of the circular base 30. The sand paper attachment 50 sands various types of surfaces as desired by manipulating the present invention in parallel or circular motions.

In use, the wax reservoir 22 is filled with wax 12. The user then utilizes the circular sponge 24 to remove the wax 12 from the wax reservoir 22 and applies said wax 12 to the vehicle. The user grasps the cylindrical handle 20 and forces the buffer pad 40 to engage the wax 12 applied to the vehicle. The user then manipulates the present invention in either parallel or circular motions to obtain the maximum polish. When the user is finished or requires use of another buffer pad 40, the user simply loosens the concentric string fastener 42 and removes the old buffer pad 40. Another buffer pad 40 is juxtaposed to the bottom of the circular base 30. The concentric string fastener 42 is tightened so as to prevent the buffer pad 40 from rotating with respect to the circular base 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wax container hand buffer comprising:

a cylindrical handle;

a tube secured to a bottom end of the cylindrical handle, where the tube is narrower than the cylindrical handle;

a circular base removably secured to the tube orthogonal to a longitudinal axis of the cylindrical handle;

a buffer pad removably secured to the circular base opposite of the tube;

wherein the cylindrical handle includes a wax reservoir exposed through an end opposite of the tube, the wax reservoir being adapted for storing wax for utilization;

wherein the cylindrical handle includes a reservoir cap which removably encloses the wax reservoir;

a circular sponge storable within the wax reservoir;

wherein the buffer pad includes an adjustable lip having at least one concentric string fastener, the string fastener for surrounding and engaging a perimeter edge of the circular base whereby the buffer pad can be removed from the circular base by loosening the string fastener.

2. The wax container hand buffer of claim 1, wherein the cylindrical handle includes a threaded fastener projecting from a bottom of the wax reservoir, through the tube and through the circular base, the treaded fastener engaging a retaining nut such that the circular handle is fastened to the circular base.

3. The wax container hand buffer of claim 2, wherein the buffer pad comprises a foam material.

4. The wax container hand buffer of claim 3, wherein the buffer pad comprises a cloth layer surrounding the foam material.

5. A wax container hand buffer comprising:

a cylindrical handle having an interior;

a tube secured to a swaged end of the cylindrical handle, where the tube is narrower than the cylindrical handle;

wherein the cylindrical handle includes a wax reservoir exposed through an end opposite of the tube, the wax reservoir being adapted for storing wax for utilization, wherein the cylindrical handle includes a reservoir cap which removably encloses the wax reservoir:

a circular sponge storable within the wax reservoir:

a circular base removably secured to the tube orthogonal to the longitudinal axis of the cylindrical handle; and a sand paper attachment removably secured to the circular base opposite of the tube.

6. The wax container hand buffer of claim 5, wherein the sand paper attachment is circular and shaped to fit a bottom of the circular base.

7. The wax container hand buffer of claim 6, wherein:

a first ergonomic handle having a first threaded end threadably engages a threaded aperture within the cylindrical handle such that the first ergonomic handle projects radially away from the cylindrical handle.

8. The wax container hand buffer of claim 7, wherein:

a second ergonomic handle having a second threaded end threadably engages a threaded aperture within the cylindrical handle opposite of the first ergonomic handle such that the second ergonomic handle projects radially away from the cylindrical handle away from the first ergonomic handle.

9. A wax container hand buffer comprising:

a substantially circular wax reservoir having a pair of oppositely positioned handles extending radially outward from said circular wax reservoir, said pair of handles having a longitudinal axis substantially perpendicular to a longitudinal axis of said circular wax reservoir;

each of said pair of handles having a number of grooves positioned on a lower portion of each of said pair of handles, said handles further being threadably attached to said circular wax reservoir;

a reservoir cap releasably engaging said circular wax reservoir;

a sponge storable within said circular wax reservoir;

a support tube projecting from a bottom of said circular wax reservoir, said support substantially aligned with said longitudinal axis of said circular wax reservoir;

a circular base member fastened to said support tube by a threaded fastener, the threaded fastener projecting from a bottom of said circular wax reservoir and through said support tube, said threaded fastener projecting through said circular base substantially at a center of said circular base and engaging a retaining nut;

a substantially circular foam buffer pad having a pair of drawstrings, each of said pair of drawstrings surrounding an opening formed in said buffer pad, said opening formed to receive said circular base, said drawstring for surrounding a perimeter edge of said circular base whereby said drawstring secures said buffer pad to said circular base; and a cloth layer surrounding an outside of said buffer pad.

* * * * *